United States Patent Office 3,531,442
Patented Sept. 29, 1970

1

3,531,442
ALPHA-SULFO-N,N'-ALKYLIDENE
BIS-AMIDE POLYMERS
Leonard E. Miller, Chagrin Falls, and Donald L. Murfin, Mayfield Heights, Ohio, assignors to The Lubrizol Corporation, Wickliffe, Ohio, a corporation of Ohio
No Drawing. Filed Mar. 2, 1967, Ser. No. 619,923
Int. Cl. C07c *143/16;* C08f *3/88, 3/90*
U.S. Cl. 260—79.3                                    10 Claims

ABSTRACT OF THE DISCLOSURE

Alpha-sulfo-N,N'-alkylidene bis-amides, i.e., alkylidene gem-bis-amides having a sulfo substituent on the carbon atom adjacent to the carbon atom bearing the two amido groups, are novel compounds which find use in applications where amides and sulfonic compounds are useful. Bis-acrylamides or the like are useful as monomers from which polymers, i.e., homopolymers and interpolymers, are readily derived. The polymers are useful as gelling agents for aqueous systems. The polymers are useful also for the preparation of fibers, plastics, resins, etc.

Organic amides are useful for a variety of purposes. In many applications it is desirable that the amides contain polar groups which impart new and useful properties. In other applications the presence of more than one amido group in a compound is desirable. Such compound is exemplified by a gem-bis-amide, i.e., one in which two amido groups are joined to a methylene group.

The presence of a different polar substituent in an amide increases the versatility of the amide in many applications. Such a polar substituent, in the case of the present invention, is a sulfo group present on a carbon atom which is alpha (i.e., adjacent) to the carbon atom bearing the amide group. The sulfo substituted amide is thus useful in applications where not only amides are desirable but also where sulfonic compounds are desirable.

Accordingly, it is a principal object of this invention to provide novel compositions of matter.

It is also an object of this invention to provide novel processes by which sulfo-amides can be prepared.

It is also an object of this invention to provide novel amides.

It is also an object of this invention to provide novel sulfonic acids and derivatives thereof.

It is also an object of this invention to provide novel polymeric substances.

These and other objects are attained by providing an alpha-sulfo-alkylidene bis-amide having the structural formula

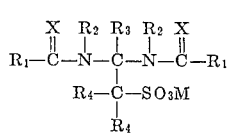

wherein $R_1$ is a hydrocarbon group; $R_2$, $R_3$, and $R_4$ are each a hydrogen or a hydrocarbon group; X is oxygen or sulfur; and M is hydrogen, an ammonium cation, or a metal cation.

In most instances, $R_1$ has up to about 30 carbon atoms, more often less than about 18 carbon atoms; it may be aliphatic or aromatic and is exemplified by aryl, alkaryl, alkyl, aralkyl or alkenyl. The alkenyl group is exemplified by vinyl, including alkyl-substituted vinyl, allyl, or other olefinic group wherein the olefinic linkage is either terminal or medial. Especially preferred hydrocarbon groups illustrative of $R_1$ are the lower alkyl groups, i.e., having less than about 8 carbon atoms and the vinyl groups including, for example, vinyl, alkyl-substituted vinyl wherein an alkyl substituent may be present on either the alpha carbon atom or the beta carbon atom, or both. The alkyl substituent of such substituted vinyl group is usually a lower alkyl such as methyl, ethyl, propyl, butyl or pentyl.

Specific examples of the hydrocarbon groups which may be present as the $R_1$ radical are: methyl, ethyl, butyl, cyclopentyl, cyclohexyl, 2-cyclohexenyl, dodecyl, octadecyl, behenyl, triacontanyl, 8-dococenyl, phenethyl, phenyl, naphthyl, heptadecenyl, heptadecyl, alpha-methyl-beta-naphthyl, tolyl, xylyl, o-decylphenyl, m-chlorophenyl, p-nitrophenyl, o-bromo-p-butyl-phenyl, o-methyl-m-octadecylphenyl, p-cyclohexylphenyl, 12-chlorooctadecyl, 10-phenyl-dodecyl, vinyl, alpha-methylvinyl, alpha-ethylvinyl, beta-methylvinyl, beta-butylvinyl, beta,beta-dimethylvinyl, beta-ethyl-beta-butylvinyl, alpha-octylvinyl, alpha-chlorovinyl and the like.

$R_2$ and $R_3$ usually are each a hydrogen group. $R_2$ may be a saturated hydrocarbon group such as is described and illustrated above; so likewise may be $R_3$. In some instances $R_2$ is an alkyl group having up to about 18 carbon atoms and $R_3$ is an aryl or an alkyl group having up to about 18 aliphatic carbon atoms.

The two $R_4$ radicals of the above formula may each be hydrogen or a hydrocarbon group such as is described and illustrated above. Preferably at least one of the two $R_4$ radicals in a bis-amide is a hydrocarbon group, often an aryl or an alkyl group having up to about 18 aliphatic carbon atoms. It should be noted that non-functional polar substituents may be present in the hydrocarbon group such as is illustrative of the $R_1$, $R_2$, $R_3$ or $R_4$ radicals, provided that the polar substituent is present in proportions so as not to alter materially the hydrocarbon character of the group. The polar substituent may be a chloro, bromo, nitro or ether group. Similarly, both cyclic and acyclic hydrocarbon groups are contemplated and for the sake of simplicity the terms "hydrocarbon," "alkyl," "alkenyl," and "aliphatic" are thus inclusive of both cyclic and acyclic groups.

The bis-amides of this invention may be thioamides or oxoamides such as are represented by the above formula wherein the two X groups are both oxygen or sulfur or one of the two X groups is oxygen and the other is sulfur. The bis(oxoamides) are preferred.

The term "sulfo" as used in the description of the present invention is described by the structural grouping —$SO_3M$ wherein M may be hydrogen, an ammonium radical or a metal radical. Thus, where M is hydrogen, the sulfo group is a sulfonic acid group; where M is an ammonium radical, the sulfo group is an ammonium sulfonate group; and where M is a metal radical, the sulfo group is a metal sulfonate group. The ammonium radical may be derived from ammonia or an amine such as a primary, secondary, or tertiary-amine. It may be a quaternary ammonium radical. The amine may be aromatic or aliphatic. It is exemplified by methylamine, dimethylamine, trimethylamine, methylethylamine, methyl dodecylamine, aniline, toluidene, cyclohexylamine, N-methyl cyclohexylamine, phenethylamine, N-butyl aniline, N-dodecyl toluidine, diphenylamine, alpha-naphthylamine, beta-naphthylamine, ethylene diamine, tetraethylene pentamine, morpholine, piperazine, N-aminoethyl piperazine, dimethyl amino propylamine, N-octadecyl propylene diamine, ethanolamine, diethanolamine, triethanolamine, etc. In most instances the amine is an aliphatic amine having from 1 to 3 alkyl groups on the nitrogen atom, each alkyl group having up to about 12 carbon atoms. Quaternary ammonium radicals are exemplified by tetramethyl quaternary ammonium radical, diethyldiphenyl quaternary ammonium radical, dibutyldidecyl quaternary ammonium radical, etc.

The metal sulfonate group illustrative of the sulfo group is usually derived from an alkali or alkaline earth metal group such as potassium, sodium, magnesium, barium, calcium, or strontium. It may also be zinc, copper, lead, aluminum or iron.

Specific examples of the bis-amides of this invention include the following wherein the sulfo group referred to therein is a sulfonic acid group: 2-sulfo-propylidene bis(acrylamide), 2-sulfo-2-methyl propylidene bis(methacrylamide), 2-sulfo-butylidene bis(acetamide), 3-sulfo-3-methyl butylidene-2,2-bis(propionamide), 2-sulfo-heptadecylidene bis(oleoamide), 2-sulfo-2-phenyl ethylidene bis(acrylamide), 2-sulfo-2-cyclohexyl ethylidene bis(octadecamide) and 2-sulfo-2,2-dicyclohexyl ethylidene bis(acrylamide). Other specific examples include the corresponding ammonium salts, the sodium salts, the potassium salts, the magnesium salts, the calcium salts, and the barium salts of the above sulfonic acids.

The bis-amides of this invention can be prepared in a number of manners. A convenient method of preparing the bis-amides involves the reaction of an aldehyde having at least one alpha-hydrogen substituent (i.e., a hydrogen substituent on the carbon atom which is adjacent to the oxo-bearing carbon atom) a nitrile and a sulfonating agent. The sulfonating agent is preferably sulfur trioxide, fuming sulfuric acid, or sulfuric acid such as 98%, 96%, 90% aqueous sulfuric acid. It may be chlorosulfonic acid or any other well-known sulfonating agent.

The aldehyde useful in the process may be one represented by the structural formula

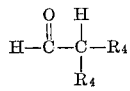

wherein $R_4$ is as described and illustrated previously. The nitrile useful in the process may be an aromatic or aliphatic nitrile such as is represented by the formula

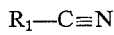

wherein $R_1$ is as described and illustrated above.

The reaction of the above process involves two moles of the nitrile, one mole of the aldehyde and one mole of the sulfonating agent. In many instances the use of an excess of the nitrile is advantageous, the excess being a convenient solvent for the reaction mixture. Also, an excess of the sulfonating agent facilitates the sulfonation reaction and is often used in the process. An excess of 5, 10, 20, or 100 times the stoichiometric amount of the nitrile and an excess of 1.1, 1.5, 1.9, 2, 5, or 10 times the stoichiometric amount of the sulfonating agent may thus be used in the process. The reaction in some instances is exothermic and is often effected at a temperature range from about 0° C. to about 250° C. A lower temperature such as −50° C. may be used; so also a temperature higher than 250° C. may be used provided that it is below the decomposition temperature of the reaction mixture. The preferred reaction temperature is within the range from about −30° C. to about 80° C. A solvent such as benzene, dioxane, toluene, n-hexane, ethylene dichloride, ethylene dibromide, naphtha, or chlorobenzene may be used and is often desirable to facilitate the mixing of the ingredients and the control of the reaction temperature. Alternatively, the bis-amides of this invention may be obtained by first sulfonating an aldehyde such as is described previously with a suitable sulfonating agent to form an alpha-sulfo-aldehyde and then reacting the alpha-sulfo-aldehyde with the nitrile. The reaction conditions and the relative amounts of the reactants are as described previously. As regards the reaction of the alpha-sulfo-aldehyde and the nitrile, it is often desirable to carry out the reaction in the presence of an acidic catalyst such as sulfuric acid or hydrochloric acid. The amount of the catalyst is usually at least one mole per mole of the nitrile; it may however be 1.5 moles, 2 moles, or even higher per mole of the nitrile.

The product of the above processes is a bis(oxomide)-substituted sulfonic acid, i.e., one represented by the above noted structural formula wherein X is oxygen, $R_2$ is hydrogen and M is hydrogen. A convenient technique of purifying the product is to convert the product to the corresponding ammonium salt such as by the treatment of the product with ammonia or an amine illustrated above. The ammonium salt (i.e., represented by the above formula, wherein M is, e.g., $NH_4$ or some other ammonium group) is usually a solid and can be precipitated from the reaction and isolated by filtration or evaporation. Similarly, the product of the above processes can be converted to a metal salt simply by neutralizing the sulfonic acid group with a metal base such as sodium hydroxide, potassium hydroxide, barium oxide, or the like. The neutralization of the product with ammonia, amine or a metal base can be carried out under conditions well-known for such neutralization. Ordinarily a stoichiometric amount of the neutralizing agent is used; however, a stoichiometric excess is often desirable to insure complete neutralization.

The bis(thioamide) can be obtained by treating the corresponding bis(oxoamide) with a sulfurizing agent such as $P_2S_5$. Bis-amides of the above formula wherein $R_2$ is a hydrocarbon can be obtained by substituting the desired hydrocarbon group for the hydrogen group for $R_2$ or by reacting an alpha-sulfo-aldehyde with a mono-(N-alkyl)amide, e.g., N-octyl acrylamide. Bis-amides of the above formula wherein $R_3$ is a hydrocarbon can be made most conveniently by reacting the corresponding halide (i.e., where $R_3$ is a halogen) with an olefin or a metal alkyl such as sodium naphthalemide, lead tetraethyl, etc.

The following examples are illustrative of the preparation of the bis-amides of this invention.

EXAMPLE 1

To a mixture of sulfur trioxide (160 grams, 2 moles) in a solvent mixture consisting of dioxane (352 grams) and ethylene dichloride (750 mm.) there is added at −20° C. isobutyraldehyde (144 grams, 2 moles). After the addition, the reaction mixture is allowed to warm to room temperature (25° C.) and is maintained at that temperature for one hour. To this mixture there is then added acrylonitrile (2190 grams, 30 moles) and 96% aqueous sulfuric acid (294 grams, 3 moles). An exothermic reaction occurs and the temperature of the reaction mixture is maintained at 40° C. until the reaction is complete. The product of such reaction is alpha - sulfo - alpha-methyl-propylidene bis(acrylamide) (i.e., 1,1 - bis(acrylamido) - 2 - methylpropane-2-sulfonic acid). The reaction mixture is then cooled to 0° C. and treated with anhydrous ammonia in an amount sufficient to neutralize the sulfonic acid. The mixture is further diluted with either ethylene dichloride or acrylonitrile whereupon the ammonium salt of the 1,1-bis(acrylamido)-2-methylpropyl-2-sulfonic acid is precipitated. The precipitate is collected on a filter and the product is purified by dissolving it in methanol, filtering the methanol solution, evaporating the methanol from the filtrate so as to recover the ammonium salt, washing the ammonium salt with acetone and ether and then drying the ammonium salt at 45°–55° C. in vacuum.

EXAMPLE 2

To a mixture of acrylonitrile (397 grams, 7.5 moles) and isobutyraldehyde (36 grams, 0.5 mole) there is added at 0° C. fuming sulfuric acid (20% $SO_3$) (150 grams, 1.6 moles). The reaction mixture is maintained at 35° C. until the reaction is complete whereupon 1,1-bis(acrylamido)-2-methylpropane-2-sulfonic acid is formed. The acid is neutralized with ammonia and the ammonium salt, after purification, is found to have the following analyses: nitrogen: 14.98%, 15% (theory 14.33%);

carbon: 39.6%, 39.4% (theory 40.94%); hydrogen: 6.62%, 6.53% (theory 6.53%).

EXAMPLE 3

1,1-bis(acetamido)-2-methylpropane-2-sulfonic acid is prepared by the procedure of Example 1 except that acetonitrile is used in place of acrylonitrile.

EXAMPLE 4

1,1 - bis(propionamido)-2-cyclohexylbutane-3-sulfonic acid is prepared by the procedure of Example 1 except that propionitrile is used in place of acrylonitrile and 2-cyclohexylbutyraldehyde is used in place of isobutyraldehyde.

EXAMPLE 5

1,1-bis(methacrylamido)-2-ethyldecane-2-sulfonic acid is obtained by the procedure of Example 1 wherein methacrylonitrile is used in place of acrylonitrile and 2-ethyldecanal is used in place of isobutyraldehyde.

EXAMPLE 6

1,1-bis(oleoamido)-2-methylheptane-2-sulfonic acid is prepared by the procedure of Example 2 except that oleonitrile is used in place of acrylonitrile and 2-methylheptanal is used in place of isobutyraldehyde.

EXAMPLE 7

Methylamine salt of an acid of Example 1 is obtained by neutralizing the acid with a 20% stoichiometric excess of methylamine.

EXAMPLE 8

Pyridine salt of the acid of Example 2 is obtained by neutralizing the acid with 100% stoichiometric excess of pyridine.

EXAMPLE 9

Aniline salt of the acid of Example 4 is obtained by neutralizing the acid with 500% stoichiometric excess of aniline.

EXAMPLE 10

Potassium salt of Example 1 is obtained by neutralizing the acid with potassium hydroxide.

EXAMPLE 11

Calcium salt of the acid of Example 2 is obtained by neutralizing the acid with lime.

The bis-amides of this invention are useful for many purposes. Those containing a relatively high molecular weight substituent having, for example, 12 or more aliphatic carbon atoms in an aliphatic hydrocarbon chain are readily miscible with organic substances such as plastics, oils, fuels, paints, asphalts, etc. They are thus useful as additives in such compositions. A particularly desirable use is as an additive in a lubricating composition such as a mineral lubricant or a synthetic lubricant. Mineral lubricants are derived from mineral oils such as SAE 5 to SAE 90 grade oils. Synthetic lubricants are derived from silicone oils or the so-called "diester" or "polyester" oils. The concentration of the bis-amide in such lubricating composition usually ranges from about 0.01% to about 10% or 20% by weight. For example, the bis(oleoamido)sulfonic acid of Example 6 is useful in the preparation of detergent additives for hydrocarbon fuels and lubricants. More specifically, the calcium salt of the sulfonic acid of Example 6 is useful as a detergent additive in the crankcase lubricant for automotive engines. Such lubricant can be prepared by blending SAE 30 mineral lubricating oil and 2.5% by weight of a calcium salt of the sulfonic acid of Example 6.

Another utility of the bis-amides of this invention is in the preparation of aqueous detergent compositions. For example, an aqueous solution containing 3% of the potassium salt of 1,1-bis(butyramido)-2-methylpropane-2-sulfonic acid is useful as a detergent composition. In general, when used for such purpose the bis-amides of this invention should contain less than a total of about 30 carbon atoms so as to meet the requirement of sufficient solubility in aqueous systems. The concentration of the bis-amide in an aqueous system usually ranges from about 0.01% to about 10% by weight. The bis-amide of this invention is useful in applications such as are discussed in U.S. 3,303,137.

The bis-amides of this invention in which the amido group contains a polymerizable, olefinic linkage are especially adapted to the preparation of polymers, i.e., homopolymers and interpolymers with other interpolymerizable monomers such as unsaturated hydrocarbons; acrylic acid, halides, esters and nitriles; styrenes; allyl halides and ethers; vinyl esters, halides, ethers and ketones; vinylidene halides, maleic acids, anhydrides, halides and esters; fumaric acids, halides and esters; vinyl oxazolidones; vinyl pyrrolidone and other vinyl-substituted heterocycles. The bis(acrylamides) including bis(alpha- or beta-alkyl substituted acrylamides) are especially useful for preparing polymers. Particularly preferred are the bis(unsubstituted acrylamides), the bis(alpha-methacrylamides), the bis(aplha-ethacrylamides), and the bis(alpha-lower alkyl (i.e., having less than about 6 carbon atoms) substituted acrylamides). Specific examples of the interpolymerizable monomers include: vinyl acetate, acrylonitrile, acrylamide, methyl methacrylate, allyl chloride, ethyl maleate, vinyl pyridine, methyl vinyl ether, methyl vinyl ketone, allyl acetate, isopropenyl acetate, di-(2-ethylhexyl)fumarate, N-vinyl pyrrolidone, vinyl butyrate, butadiene, isoprene, ethylene, styrene, divinyl benzene, vinyl stearate, methyl acrylate, 2-ethylhexyl acrylate, di-2-ethylhexylmaleate, ethylene glycol maleate, vinyl pyrimidine, vinyl chloride, vinyl fluoride, vinylidence chloride, acrylic acid, methacrylic acid, maleic anhydride, acrylonitrile, lauryl acrylate, butyl vinyl ether, N-methylacrylamide, methacrylamide, methacrylonitrile, ethylene sulfonic acid, etc.

The polymers are obtained by treating the polymerizable bis-amide, or a mixture thereof with interpolymerizable monomer or monomers, with a polymerization catalyst such as a free radical-generating substance, e.g., benzoyl peroxide, hydrogen peroxide, azobis-isobutyronitrile, tertiary-butyl hydroperoxide, cumyl peroxide, potassium persulfate or the like. Interpolymers of 0.001 mole percent to 99.99 mole percent of the polymerizable bis-amide of this invention and from 0.001 mole percent to 99.99 mole percent of the interpolymerizable monomer or a mixture of two or more interpolymerizable monomers can be obtained by well-known polymerization techniques. In most instances the molar ratio of the polymerization bis-amide of this invention to an interpolymerizable monomer or each of two or more interpolymerizable monomers in the interpolymer is within the range of from about .1 to 10. A convenient polymerization process involves dissolving the monomer or monomers in a solvent such as benzene, toluene, naphtha, white oil or the like or emulsifying or suspending the monomer in an aqueous medium and then initiating the polymerization by contacting the monomer with a polymerization catalyst, usually at a concentration of 0.001% to about 10% by weight of the monomer. The polymerization temperature usually ranges from about −50° C. to 250° C., preferably from about 0° C. to about 100° C. The polymers may be of low molecular weight such as are illustrative of dimers, trimers, tetramers, pentamers, etc. They usually have molecular weights ranging from about 250 to about 1,000,000, more often from about 500 to about 500,000.

The polymerization is illustrated as follows:

EXAMPLE A

A copolymer of the ammonium salt of 1,1-bis(acrylamido)-2-methylpropane-2-sulfonic acid and ethylacrylate is obtained by adding aqueous ammonium persulfate (0.25 gram) and aqueous sodium metabisulfite (0.11 gram) to a mixture of water (300 ml.), the ammonium salt of the sulfonic acid of Example 1 (0.5 gram), and ethylacrylate (49.5 grams) at 40° C. The copolymer is then isolated from the polymerization mixture as a resinous solid.

EXAMPLE B

A homopolymer of the ammonium salt of 1,1-bis(acrylamido)-2-methylpropane-2-sulfonic acid is obtained by treating a mixture of the ammonium salt (50 grams) and water (450 ml.) with two portions of aqueous ammonium persulfate (0.25 gram) and aqueous sodium metabisulfite (0.11 gram) at room temperature. A white solid polymer is obtained.

EXAMPLE C

A coplymer of the ammonium salt of 1,1-bis(acrylamido-2-methylpropane-2-sulfonic acid and N-(3-oxo-1,1-dimethyl-1-butyl)acrylamide is obtained by treating a mixture of 0.5 gram of the former and 49.5 grams of the latter in 400 ml. of water with aqueous ammonium persulfate (0.25 gram) and aqueous sodium metabisulfite (0.11 gram) at room temperature until the polymerization is complete. A white solid polymer is obtained.

The polymers are useful in the preparation of plastics, fibers, resins, and other polymeric compositions. Because of the presence of multifunctional groups in the bisamides, the polymers derived therefrom possess new and useful properties. For example, the sulfonic group imparts dye susceptibility and anti-static properties to the polymer. Consequently, a fibrous composition containing the polymers of the bis-amides of this invention has improved dye susceptibility properties and anti-static properties. A useful fibrous composition is thus exemplified by a fiber blend consisting of 96% by weight of nylon (polycaprolactam) or polyacrylonitrile and 4% by weight of a fibrous polymer of the bis-amide of Example 1. Another fibrous composition is formed by interpolymerizing the bis-amide of Example 1 (5 mole percent) and acrylonitrile (95 mole percent).

Another utility of the polymers of the bis-amides of this invention is associated with their ability to act as a non-Newtonian agent for aqueous systems. For example, the addition of 0.5 gram of the polymer of Example B to 100 ml. of water imparts non-Newtonian properties to the aqueous system. The non-Newtonian properties are demonstrated as follows. An aqueous system is agitated at room temperature (25° C.) by means of a stirrer rotating at a specific speed. The viscosity value of the system after one minute of agitation at a specific speed is then measured and is reported in terms of centipoise per second (cps.). For comparison, the viscosity value of water is likewise measured (at 7° C.). The results of the measurements are reported in Table I below.

TABLE I

| System | Stirrer speed revolution/ minute | Viscosity (c.p.s.) |
|---|---|---|
| (A) Aqueous solution of 0.5 gram of the polymer of Example B in 100 grams of water | 2 | 4300 |
|  | 4 | 2875 |
|  | 10 | 1700 |
|  | 20 | 1150 |
| (B) Water (measured at 77° C.) | 2 | 3 |
|  | 4 | 6 |
|  | 10 | 8 |
|  | 20 | 8 |

It is noted that the polymer is an effective thickener for aqueous systems, as shown by the relatively high viscosity values for System A. Further, the viscosity of System A decreases with an increase in the stirrer speed or shear rate; such decrease is indicative of the non-Newtonian characteristics of the system. Such property is desirable for the so-called "non-drip" or thixotropic paints. Thus an example of a paint composition is as follows: A composition consisting of 85 parts (by weight) of water, 275 parts of titanium dioxide (pigment), 10 parts of a polyethylene glycol mono-heptylphenyl ether (emulsifier), 550 parts of an acrylic latex (consisting of 44% by weight of poly(methylmethacrylate) resin and 56% of water), and 10 parts of the polymer of Example B as the thixotropic agent. When used as a non-Newtonian additive, the polymer is usually present as a concentration ranging from about 0.1 to about 10 parts by weight of the final composition.

What is claimed is:
1. A polymer prepared by (A) homopolymerizing an alpha-sulfo-alkylidene bis-amide or (B) interpolymerizing an alpha-sulfo-alkylidene bis-amide with at least one interpolymerizable monomer selected from the class consisting of unsaturated hydrocarbons; acrylic acid, halides, esters and nitriles; styrenes; allyl halides and ethers; vinyl esters, halides, ethers and ketones; vinylidene halides; maleic acids, anhydrides, halides and esters; fumaric acids, halides and esters; and vinyl-substituted heterocycles, said alpha-sulfo-alkylidene bis-amide having the structural formula

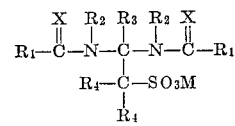

wherein $R_1$ is allyl, vinyl, lower alkyl-substituted vinyl, or a polar-substituted vinyl or lower alkyl-substituted vinyl wherein the polar substituent is nitro, chloro or bromo; $R_2$, $R_3$, and $R_4$ are each a hydrogen or a hydrocarbon group; X is oxygen or sulfur; and M is hydrogen, and ammonium cation or a metal cation.

2. The polymer of claim 1 wherein $R_3$ is hydrogen and X is oxygen.

3. The polymer of claim 2 wherein $R_4$ is an alkyl group having up to about 8 carbon atoms.

4. The polymer of claim 3 wherein $R_1$ is vinyl or lower alkyl-substituted vinyl.

5. A finely-divided fire-extinguishing composition as is methyl or ethyl, and M is $NH_4+$ or a metal cation.

6. The polymer of claim 4 wherein it is an interpolymer of the bis-amide and an alkyl acrylate or methacrylate.

7. The polymer of claim 4 wherein it is the interpolymer of the bis-amide and acrylonitrile.

8. The polymer of claim 5 wherein it is the interpolymer of the bis-amide and an alkyl acrylate or methacrylate.

9. The polymer of claim 5 wherein it is the interpolymer of the bis-amide and acrylonitrile.

10. The polymer of claim 5 wherein it is the homopolymer.

References Cited

UNITED STATES PATENTS

| 2,527,300 | 10/1950 | Dudley | 260—89.7 |
| 2,983,712 | 5/1961 | Wilkinson. | |
| 3,364,183 | 1/1968 | Talet et al. | 260—89.7 |

JAMES A. SEIDLECK, Primary Examiner

U.S. Cl. X.R.

8—55; 260—29.6, 78.5, 429.9, 438.1, 439, 513, 857, 898

UNITED STATES PATENT OFFICE
CERTIFICATE OF CORRECTION

Patent No. 3,531,442          Dated September 29, 1970

Inventor(s)   Leonard E. Miller et al.

It is certified that error appears in the above-identified patent and that said Letters Patent are hereby corrected as shown below:

Column 8, line 45, "A finely-divided fire-extinguishing composition as" should read -- The polymer of claim 3 wherein $R_1$ is vinyl, $R_4$ --.

Signed and sealed this 20th day of April 1971.

(SEAL)
Attest:

EDWARD M. FLETCHER, JR.                WILLIAM E. SCHUYLER, JR.
Attesting Officer                      Commissioner of Patents